United States Patent
Fukuda

[11] Patent Number: 5,711,731
[45] Date of Patent: Jan. 27, 1998

[54] BICYCLE REAR DERAILLEUR JOCKEY PULLEY

[75] Inventor: Masahiko Fukuda, Shimonoseki, Japan

[73] Assignee: Shimano, Inc., Osaka, Japan

[21] Appl. No.: 708,556

[22] Filed: Sep. 6, 1996

[30] Foreign Application Priority Data

Sep. 26, 1995 [JP] Japan ................................ 7-270636

[51] Int. Cl.⁶ .................................................. F16H 59/00
[52] U.S. Cl. ............................ 474/79; 474/80; 474/160
[58] Field of Search ......................... 474/162, 78–82, 474/160

[56] References Cited

U.S. PATENT DOCUMENTS

| 4,433,963 | 2/1984 | Shimano | 474/80 |
| 4,575,365 | 3/1986 | Nagano | 474/80 |
| 5,350,339 | 9/1994 | Carmichael | 474/79 |
| 5,466,194 | 11/1995 | Steinberg et al. | 474/80 |

FOREIGN PATENT DOCUMENTS

| 0 031 712 A2 | 7/1981 | European Pat. Off. | B62M 9/12 |
| 0 133 057 A3 | 2/1985 | European Pat. Off. | B62M 9/12 |
| 94 08 605 U | 11/1994 | Germany | B62M 9/00 |
| 295 01 913.1 | 4/1995 | Germany | B62M 9/12 |
| 2-17997 | 5/1990 | Japan . | |
| 2047359 | 11/1980 | United Kingdom | B62M 9/12 |

*Primary Examiner*—Roger J. Schoeppel
*Attorney, Agent, or Firm*—James A. Deland

[57] ABSTRACT

A bicycle rear derailleur jockey pulley assembly includes a cogwheel supported on a bearing. The bearing includes an outer ring supporting the cogwheel, an inner ring disposed radially inwardly of the outer ring, and a plurality of rolling members disposed between the inner ring and the outer ring. The outer ring is capable of movement relative to the inner ring in an axial direction so that the jockey pulley may follow the axial movement of the chain after shifting.

18 Claims, 7 Drawing Sheets

BICYCLE REAR DERAILLEUR JOCKEY PULLEY

BACKGROUND OF THE INVENTION

The present invention is directed to bicycle derailleurs and, more particularly, to a rear derailleur jockey pulley which is capable of moving axially relative to a support axle after shifting.

A rear derailleur is a device that changes a gear ratio of a bicycle transmission by shifting the engagement of a chain among a plurality of sprockets. To accomplish this, the rear derailleur is equipped with a movable chain guide that guides the chain to the desired sprocket. The chain guide comprises two pulleys, called the jockey pulley and the idler pulley, that are positioned between inner and outer guide plates (cage plates). The chain passes over the pulleys and is guided by the pulleys as the chain guide moves from one sprocket to another.

After shifting, the position of the jockey pulley relative to the freewheel sprockets is important, and it is desirable that the jockey pulley be positioned as much as possible within the same plane as the target freewheel sprocket in alignment with the chain. In reality, however, it is impossible to achieve perfect alignment between the two due to such factors as backlash of the shift lever that controls the rear derailleur, and the setting errors and the like (such as cable tension adjustment) associated with rear derailleur mounting. For these reasons, a certain degree of play has been provided to conventional jockey pulleys in the direction in which the chain is shifted (in the direction perpendicular to the chain line) so that the jockey pulley can move a slight mount (e.g., 0.7 mm) sufficient to absorb the aforementioned errors and properly align with the sprocket wheel. To accomplish this, the jockey pulley is supported on an axle through sliding bearings fabricated from ceramics for strengthening wear resistance. This enables the pulley to withstand harsh use conditions, as when grit, grime, and other foreign matter penetrated the jockey pulley, as well as the load produced by chain tension. However, such a sliding bearing is slow in moving because of substantial sliding friction involved in the contact between the ceramic bearing and the axle. For this reason, the route traveled by the jockey pulley during a shift of the chain into "high" versus a shift of the chain into "low" is different. Such an effect is called hysteresis, and a large hysteresis prevents rapid shifting of the chain. To avoid a large hysteresis, a jockey pulley requires maximum rigidity as well as low sliding friction.

SUMMARY OF THE INVENTION

The present invention is directed to a bicycle rear derailleur jockey pulley that moves rapidly by eliminating excessive sliding friction of the pulley to thereby minimize the hysteresis characteristics of the pulley. In one embodiment of the present invention, a bicycle rear derailleur jockey pulley assembly includes a cogwheel supported on a bearing. The bearing includes an outer ring supporting the cogwheel, an inner ring disposed radially inwardly of the outer ring, and a plurality of rolling members disposed between the inner ring and the outer ring. The outer ring is capable of movement relative to the inner ring in an axial direction so that the jockey pulley may follow the axial position of the chain after shifting even when there is some error in the axial position of the derailleur chain guide.

In a more specific embodiment, the outer ring has a length in the axial direction that is less than a corresponding length of the inner ring so that a space may be formed between the outer ring and a casing which houses the bearing to allow movement of the outer ring relative to the inner ring. Sealing members may be disposed on opposite sides of the jockey pulley assembly to prevent contaminants from entering the being.

BRIEF DESCRIPTION OF THE DRAWINGS

FIGS. 3, 3A and 3B are enlarged cross sectional views of the jockey pulley assembly shown in FIG. 1;

DETAILED DESCRIPTION OF THE EMBODIMENTS

Figure 1:
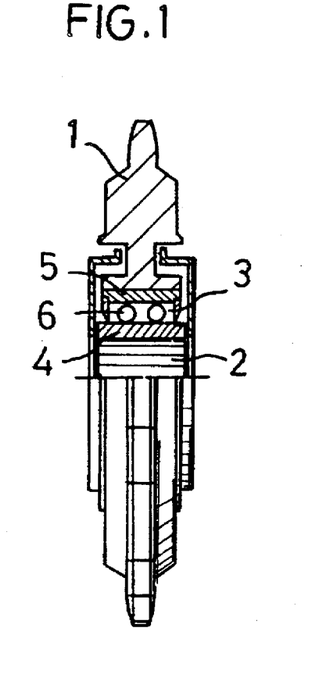
FIG. 1 is a partial cross sectional front view of a particular embodiment of a jockey pulley assembly according to the present invention.
Figure 2:
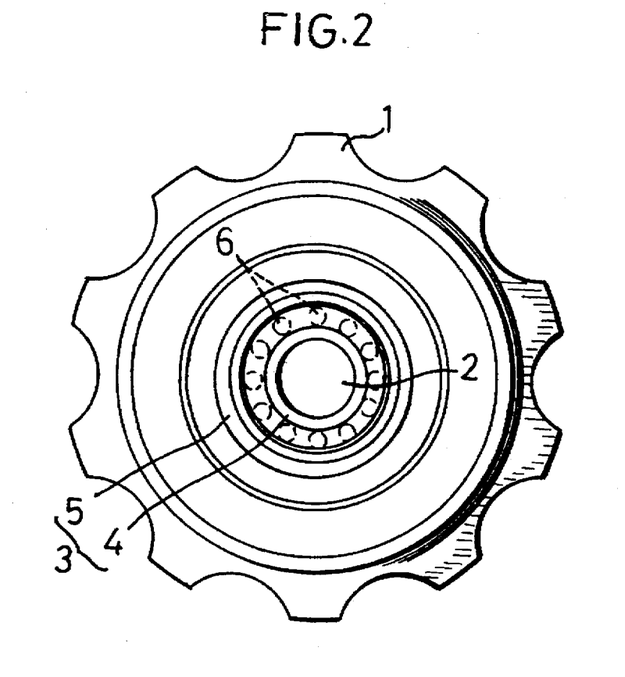
FIG. 2 is a side view of the jockey pulley assembly shown in FIG. 1.

FIG. 1 is a partial cross sectional from view of a particular embodiment of a jockey pulley assembly according to the present invention, and FIG. 2 is a side view of the jockey pulley assembly shown in FIG. 1. As shown in those figures, a jockey pulley 1 is in the shape of a cogwheel and part of its periphery engages with a continuous chain (not illustrated). A pulley bolt (not illustrated) passes through a center hole 2 to mount the jockey pulley 1 to a cage plate (not shown). The center hole 2 is formed by a rolling bearing 3. The rolling bearing 3 is equipped with an outer ring 5 and an inner ring 4 that defines the center hole 2. The diameter of the inner ring 4 is smaller than that of the outer ring 5. Balls 6, which are rolling elements, are installed between the inner ring 4 and the outer ring 5. In this embodiment, the inner ring 4 and outer ring 5 are fabricated from stainless steel.

Figure 3:
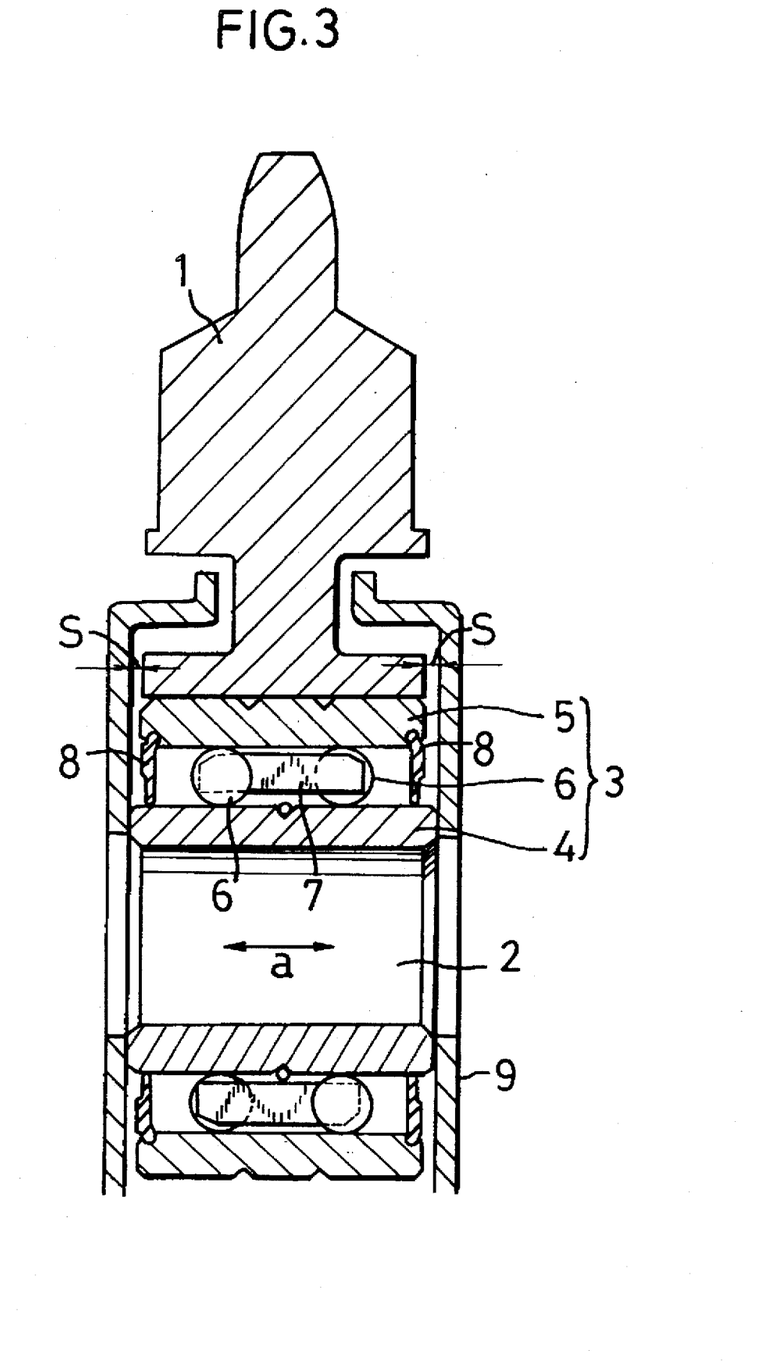

FIG. 3 is a partial enlargement of FIG. 1 and shows that the balls 6 comprise a plurality of balls arranged in rows separated by a space in the axial direction α and having different phases in the peripheral direction. This plurality of balls 6 is rotatably supported by one or two ball retainers 7 positioned between the inner ring 4 and the outer ring 5. In this embodiment, the ball retainer 7 is fabricated from nylon. Ring-shaped sealing components 8 are provided to the left and right in the axial direction between the inner ring 4 and the outer ring 5. The inner and outer peripheral surfaces of sealing components 8 are in slidable contact with the inner ring 4 and outer ring 5 peripheral surfaces, respectively. When the outer peripheral sides of the sealing components 8 are fixed to the inner peripheral surface of the outer ring 5, then the inner peripheral surfaces of the sealing components 8 are slidable on the outer peripheral surface of the inner ring 4.

The inner peripheral surface of the outer ring 5 is provided with a single cylindrical surface, and the inner peripheral surface of the outer ring 5 can be used in its entirety to form this single cylindrical surface. In this embodiment, the inner peripheral surface of the outer ring 5 is equipped with a cylindrical surface just wide enough to equal the length that was designed to enable the balls 6 to roll in the axial direction. The outer peripheral surface of the inner ring 4 also is provided with a single cylindrical surface, and the outer peripheral surface of the inner ring 4 can be used in its entirety to form this single cylindrical surface. An outside casing 9 covers the bearing 3 from the left and right. The casing 9 is fixed relative to the derailleur cage (not shown) plate by a fixing bolt (not shown).

Figure 3A:
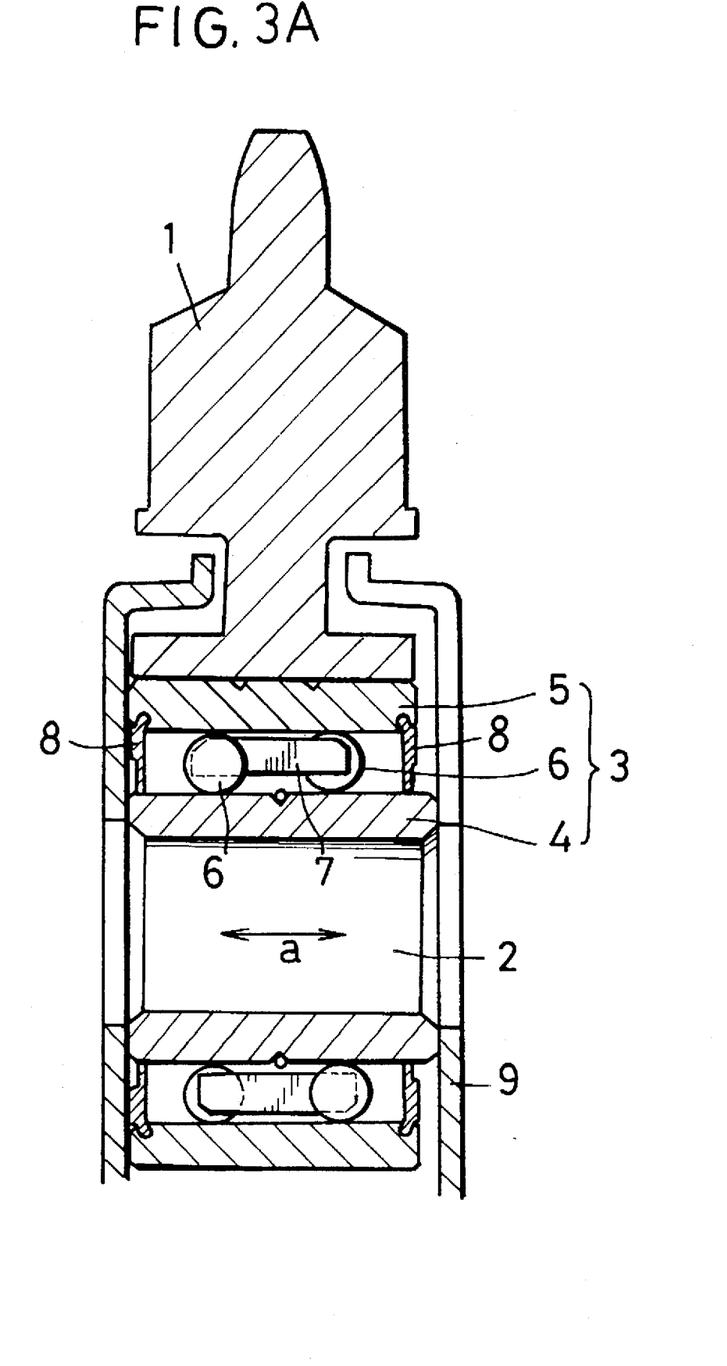
FIGS. 3A and 3B are views of the jockey pulley shown in FIG. 3 in shifted positions.
Figure 3B:
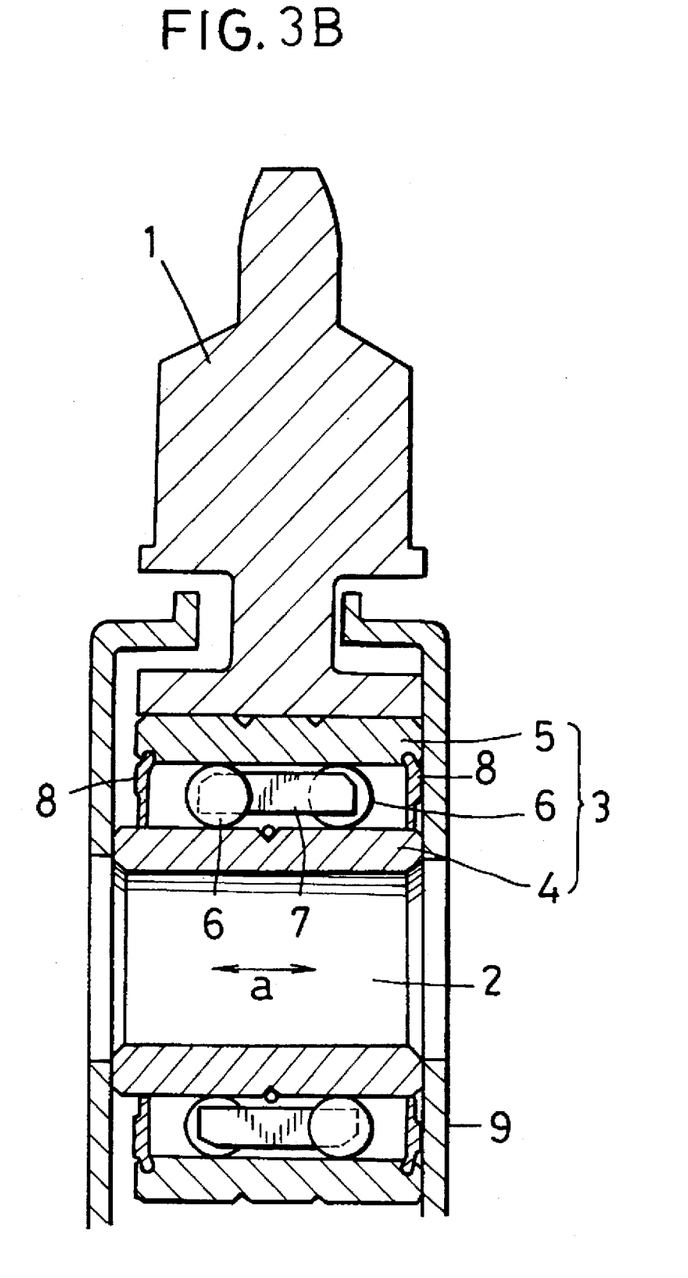

The width of the outer ring 5 in the axial direction is less than the width of the inner ring 4 in the axial direction so that two gaps S (FIG. 3) are disposed between the outer ring 5 and the inner surface of the casing 9. As a result, the outer ring 5 is movable in the axial direction α relative to the inner ring 4 by the distance defined by the gaps S as shown in FIGS. 3A and 3B.

The operation of the first embodiment will be described next. Due to causal factors mentioned above, such as dimensional errors, force acts in the axial direction α on the chain after shifting. This force is communicated to the jockey pulley 1, causing it to move within the range of the two gaps S to properly align the jockey pulley 1 with the selected sprocket.

Foreign matter, such as dust, does not enter from the exterior into the space containing the balls 6 due to the sealing components 8. Consequently, the surfaces of the inner ring 4 and the outer ring 5 are not scratched although these rings are fabricated from metal, and the rolling property of the balls 6 is favorably maintained. The two rows of balls 6 to the left and right are kept at fixed intervals by the ball retainer 7. Consequently, the parallelism between the outer peripheral surface of the inner ring 4 and the inner peripheral surface of the outer ring 5 is favorably maintained, and the outer ring 5 has good movability relative to the inner ring 4. This, in turn, eliminates disparities between the position of the jockey pulley 1 and the selected sprocket.

Figure 4:
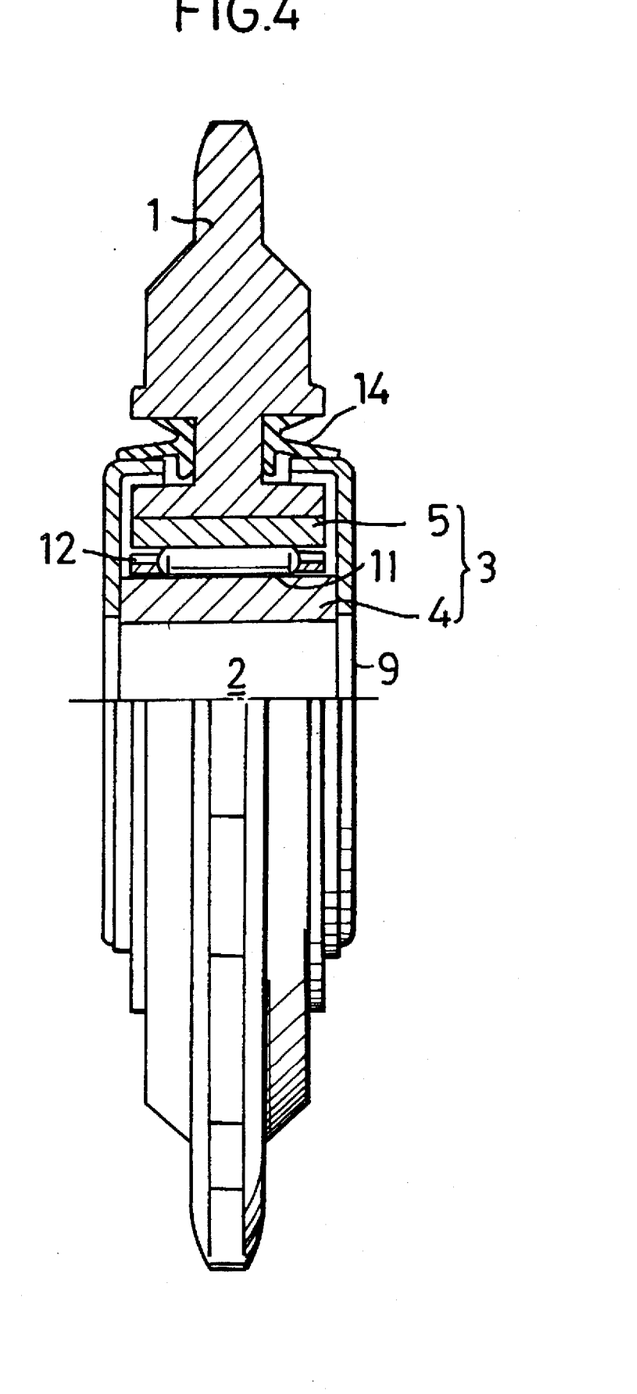
FIG. 4 is a partial cross sectional front view of an alternative embodiment of a jockey pulley assembly according to the present invention.

FIG. 4 is a partial cross sectional front view of an alternative embodiment of a jockey pulley assembly according to the present invention. As shown in FIG. 4, the relationship between the jockey pulley 1, the inner ring 4, the outer ring 5 and the casing 9, is identical to the relationship of these parts in the first embodiment. The first point on which this embodiment differs from the previous embodiment is that where the first embodiment employed balls for the rolling elements, the rolling elements in this embodiment are elongated rod-shaped rollers. More specifically, a plurality of rollers 11 are positioned between the inner ring 4 and the outer ring 5 in the peripheral direction at fixed intervals. Rollers 11 are retained by one or two roller retainers 12, and they slide relatively easily on the inner peripheral surface of the outer ring 5 because the inner peripheral surface of the outer ring 5 is configured as a single cylindrical surface. A sealing component 14 is installed between the jockey pulley 1 and the outer peripheral end surface of the casing 9. This sealing component 14 prevents foreign matter such as dust from penetrating from the exterior into the casing 9.

Figure 5:
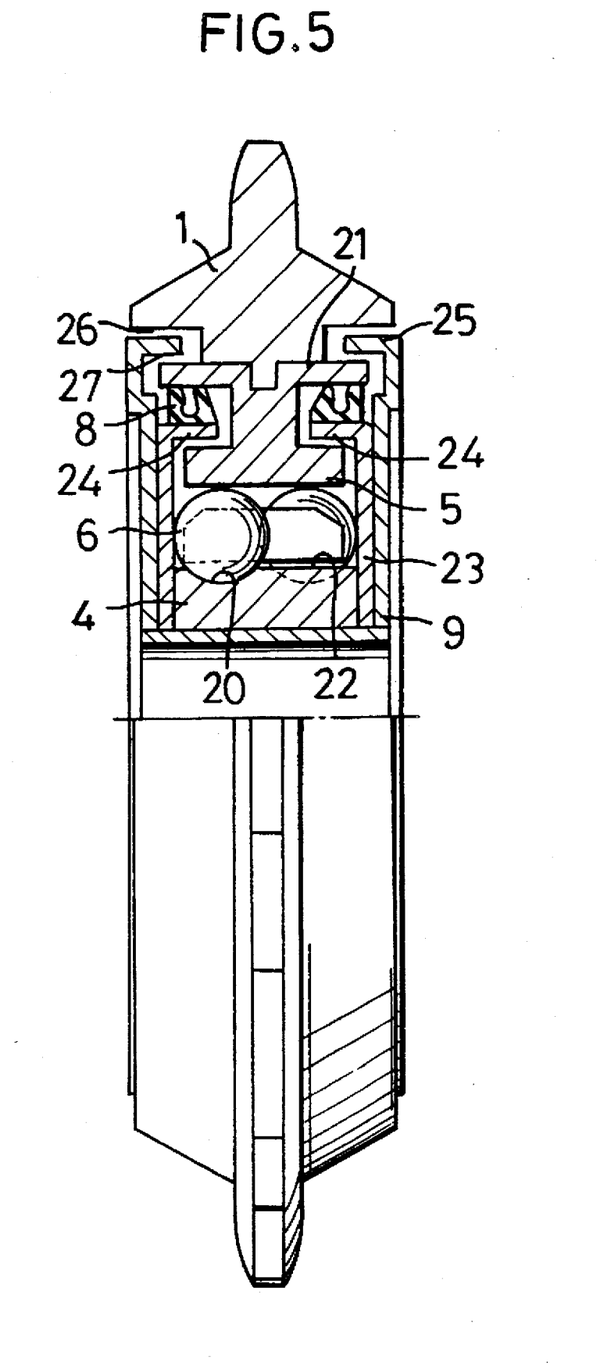
FIG. 5 is a partial cross sectional front view of another alternative embodiment of a jockey pulley assembly according to the present invention.

FIG. 5 is a partial cross sectional front view of another alternative embodiment of a jockey pulley assembly according to the present invention. As shown in FIG. 5, the outward side of the outer ring 5, which is fitted into the jockey pulley 1 from the inner peripheral surface side, is provided with an integral fitting ring 21. A peripheral groove 20 is formed on the outer peripheral surface 22 on the inner ring 4 for fitting parts of the balls 6. Identical to the first embodiment is the fact that these left and right rows of balls 6 have different phases with respect to each other, and also that the inner peripheral surface of the outer ring 5 is a cylindrical surface. Also identical to the first embodiment is the fact that the lateral width of the outer ring 5 is smaller than the lateral width of the inner ring 4.

In this embodiment, an inside casing 23 is provided integrally on either side of the inner ring 4 separate from the casing 9. The outer peripheral members of the inside casing 23 are bent inward to form bent members 24 such that both of the outer peripheral members face inwardly. The sealing component 8 is attached to the outer peripheral surface of the bent members 24, and the outer peripheral end of the sealing component 8 slides over the inner peripheral surface of the fitting ring 21. Two tracks are formed for the slidable ends of this sealing component 8.

The outside ends of the outside casing 9 are also provided with second bent members 25 which are bent inwardly. The second bent members 25 are fitted into the peripheral grooves 26, which are formed by the jockey pulley 1, such that these parts do not touch, and form labyrinth cavities 27 between the jockey pulley 1 and the outside casing 9. The sealing component 8 is positioned like a backwards L towards the inner areas of the labyrinth cavities 27 to enhance the sealing effect.

Figure 6:
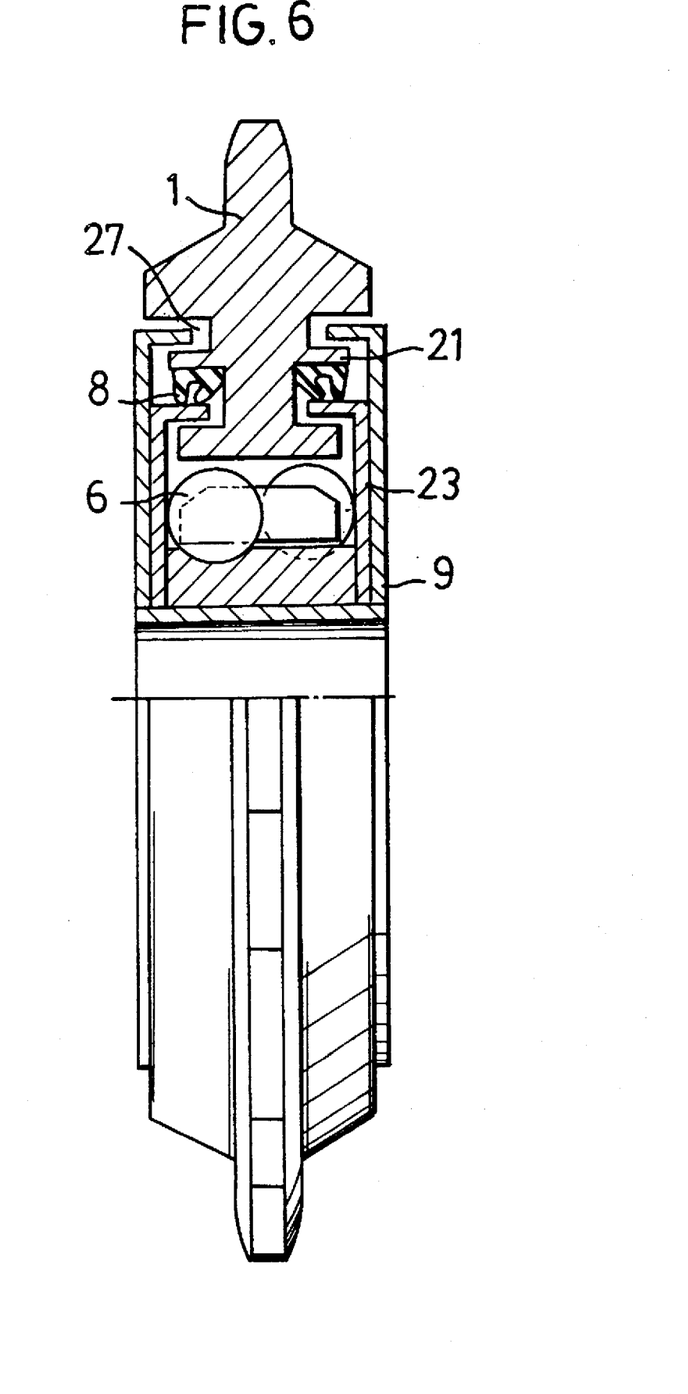
FIG. 6 is a partial cross sectional front view of another alternative embodiment of a jockey pulley assembly according to the present invention.

FIG. 6 is a partial cross sectional front view of another alternative embodiment of a jockey pulley assembly according to the present invention. In this embodiment, the fitting ring 21, which was shown in FIG. 5, is formed integrally on the jockey pulley 1 side, and the sealing component 8 is fixed to the rotating side, i.e., the inner peripheral surface of the fitting ring 21. The inner peripheral ends of the sealing component 8 slide on the outer peripheral surface of the bent members 24 of the inside casing 23. The point which is identical to the other aforementioned embodiments is the fact that two tracks are formed for the slidable ends of this sealing component 8. A labyrinth configuration 27 is also formed. Simple assembly and good sealability are achieved as a result of using other embodiments such as these.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle rear derailleur jockey pulley assembly comprising: a cogwheel (1) supported on a bearing (3), the bearing (3) including:
    an outer ring (5) supporting the cogwheel (1);
    an inner ring (4) disposed radially inwardly of the outer ring (5);
    a plurality of rolling members (6,11) disposed between the inner ring (4) and the outer ring (5); and
    wherein the outer ring (5) is capable of movement relative to the inner ring (4) in an axial direction (a).

2. The jockey pulley assembly according to claim 1 wherein an outer peripheral surface of the inner ring (4) is formed as a single cylindrical surface.

3. The jockey pulley assembly according to claim 1 wherein the plurality of rolling members (6) comprise a plurality of balls.

4. The jockey pulley assembly according to claim 1 wherein the plurality of rolling members (11) comprise a plurality of elongated rollers.

5. The jockey pulley assembly according to claim 1 further comprising a stopper (20) for preventing movement of the plurality of rolling members (6) in the axial direction (a).

6. The jockey pulley assembly according to claim 1 wherein the outer ring (5), the inner ring (4), and the plurality of rolling members (6) are fabricated from stainless steel.

7. The jockey pulley assembly according to claim 1 further comprising a nylon retainer (7,12) for holding the plurality of rolling members (6,11).

8. The jockey pulley assembly according to claim 1 wherein the outer ring (5) has a length in the axial direction (a) that is less than a corresponding length of the inner ring (4).

9. The jockey pulley assembly according to claim 1 further comprising sealing members (8) fitted at opposite ends of the outer ring (5).

10. The jockey pulley assembly according to claim 9 wherein the sealing members (8) cover an annular space defined by the inner ring (4) and the outer ring (5).

11. The jockey pulley assembly according to claim 1 further comprising a casing (9) for covering the bearing (3), wherein a gap (S) is formed between the casing (9) and the outer ring (5) in the axial direction (a).

12. The jockey pulley assembly according to claim 11 further comprising a sealing member (14) fitted on each side of the cogwheel (1) and contacting a corresponding side of the casing (9).

13. The jockey pulley assembly according to claim 12 wherein the cogwheel (1) includes:

an inner cogwheel portion;

an outer cogwheel portion;

an intermediate cogwheel portion having a length in the axial direction (a) that is less than corresponding lengths of the inner cogwheel portion and the outer cogwheel portion for forming recesses on opposite sides of the cogwheel (1); and wherein each sealing member (14) is disposed in a corresponding one of the recesses.

14. The jockey pulley assembly according to claim 13 wherein each casing (9) includes a bent member projecting into a corresponding one of the recesses in the cogwheel (1).

15. The jockey pulley assembly according to claim 11 wherein the outer ring (5) includes:

an inner ring portion;

an outer ring portion (21);

an intermediate ring portion having a length in the axial direction (a) that is less than corresponding lengths of the inner ring portion and the outer ring portion for forming recesses on opposite sides of the outer ring (5).

16. The jockey pulley assembly according to claim 15 further comprising an inner casing (23) disposed on each side of the inner ring portion, each inner casing having a bent member (24) projecting into a corresponding one of the recesses in the outer ring (5).

17. The jockey pulley assembly according to claim 16 further comprising a sealing member (8) disposed between the outer ring portion (21) and a corresponding one of the bent members (24) on each side of the outer ring (5).

18. The jockey pulley assembly according to claim 17 wherein the cogwheel (1) is spaced apart from the outer ring portion (21) by an intermediate cogwheel portion having a length in the axial direction (a) that is less than the corresponding length of the outer ring portion for forming recesses on opposite sides of the cogwheel (1), and wherein each casing (9) includes a bent member (25) projecting into a corresponding one of the recesses in the cogwheel (1).

* * * * *